UNITED STATES PATENT OFFICE.

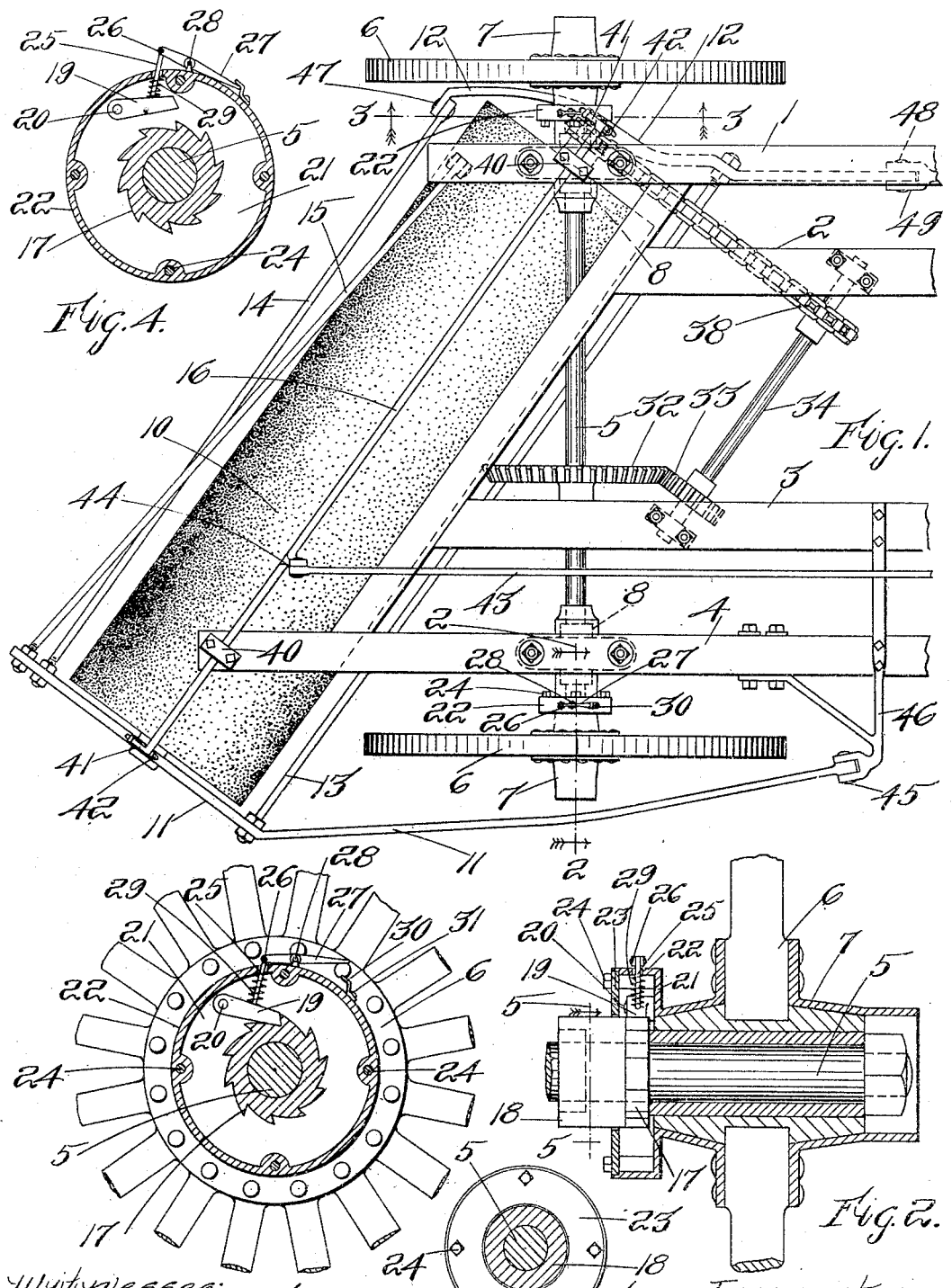

JOSIAH FOWLER, OF CAMBRIDGE, MASSACHUSETTS.

STREET-SWEEPING MACHINE.

959,000.  Specification of Letters Patent.  Patented May 24, 1910.

Application filed May 5, 1909. Serial No. 494,050.

*To all whom it may concern:*

Be it known that I, JOSIAH FOWLER, citizen of the United States, residing at Cambridge, in the county of Middlesex and State of Massachusetts, have invented a certain new and useful Improvement in Street-Sweeping Machines, of which the following is a specification, reference being had therein to the accompanying drawings.

The invention relates especially to the wheels and to the driving mechanism and guards therefor of a street sweeping machine.

One object of the invention is to provide a suitable dust protector and guard for the driving mechanism in the hub of the wheel.

Another object of the invention is to provide a simple device for releasing the pawl from the ratchet and for locking the pawl in its disengaged position, when desired, as for instance when driving the machine to and from the place where it is to be used and it is desired to keep the broom from revolving.

The invention will be fully understood taken in connection with the accompanying drawings and the novel features will be pointed out and clearly defined in the claims at the close of the specification.

In the drawings:—Figure 1 is a plan view showing the rear wheels and broom and driving mechanism, it being broken away so that the front part of the machine is not shown as that forms no part of the invention. Fig. 2 is an enlarged section of one of the hubs on line 2—2 of Fig. 1 showing the ratchet, pawl and guard. Fig. 3 is an enlarged sectional view on line 3—3 of Fig. 1. Fig. 4 is a section through the ratchet wheel and case showing the pawl locked in its disengaged position out of the ratchet. Fig. 5 is a section on line 5—5 of Fig. 2 looking in the direction of the arrows, said figure being on a somewhat smaller scale than Fig. 2.

Referring now to the drawings:—The parts marked 1, 2, 3 and 4 represent portions of the frame of the machine which support the other parts. The axle 5 on which the rear wheels 6 are mounted is journaled in boxes on the under side of the frame in well known manner, the hubs of the boxes being shown at 8. The broom 10 is represented as hung in well known manner, its axles being journaled in arms 11 and 12 which are connected together by tie rods 13, 14 to prevent spreading of the arms and consequent disconnection of the broom. As an additional preventive of endwise movement of the broom, a tie rod 15 connects the arm 11 with the frame bar 1.

Extending lengthwise above the broom is a rocking lever 16 which passes through bearings in brackets 40 secured to the frame bars 1, 4, the ends of the said rocking lever being formed with arms 41 to which are secured respectively one end of a chain 42, the other end of the chain being attached to the arms 11, 12 respectively, so that by rocking the lever 16 the broom may be raised slightly from the ground. A connecting rod 43 is pivoted at one end to a crank arm 44 attached to the rocking shaft 16 and at its other end said connecting rod is connected with suitable mechanism (not shown) whereby the driver may operate the rocking lever to lift the broom. In order to allow for the lifting of the broom the arm 11 is pivoted at 45 to bracket 46 and the arm 12 is pivoted at 47 to the rod 14 and at 48 to the bracket 49.

Each wheel 6 is provided with a hub 7 which is normally loose on the axle 5 and free to turn thereon. A ratchet wheel 17 having a hub 18 is fast on the axle 5. A pawl 19 is pivoted at 20 to the hub 7 and is adapted to engage with the teeth of the ratchet 17 so that when so engaged the axle 5 will be locked to the hub 7 and partake of the rotation of the wheel 6. Connected with the hub 7 is a box which entirely incloses the ratchet 17 and pawl 19 and protects them from mud and dust. This box has an annular vertical flange 21 which extends radially outward from the inner end of the hub 7, thence an annular horizontal flange 22 which extends at right angles to the flange 21 and encircles the ratchet 17 and pawl 19 and from the end of the flange 22 there is a radially inwardly extending annular flange 23 which extends very nearly to the hub 18 of the ratchet, coming as closely thereto as is practicable to avoid frictional contact with the said ratchet hub 18. Flange 23 is shown as separate from the flange 22 and secured to the flange 22 by bolts 24.

The diameter of the annular flange 22 should be enough greater than that of the ratchet 17 to afford some space between the periphery of the ratchet 17 and the flange 22. Secured to the pawl 19 is a pin 25 which passes out through a hole in the flange 22 and is pivoted at its outer end at 26 to one end of a lever 27 fulcrumed at 28. A spring 29 is coiled around the pin 25, one end of the spring abutting against the pawl 19 and the other end abutting against the inner periphery of the flange 22 and tends to hold the pawl 19 in engagement with the ratchet 17. By pressing the free end of the lever 27 toward the center of the hub the lever will be turned on its fulcrum and lift the pin 25, thereby disengaging the pawl 19 from the ratchet 17 and when so disengaged the axle 5 will not revolve with the wheel 6. As soon as the pressure on the lever 27 is released the spring 29 will pull the pin back into the box and engage the pawl again with the ratchet. I have provided locking mechanism, however, whereby the lever 27 may be locked in its position to hold the pawl 19 out of engagement with the ratchet when desired. This locking means may be any suitable device, the form of device which I have shown being a catch 30 pivoted at 31 so that the catch 30 can swivel on the pivot 31. When the free end of the lever 27 is pressed in toward the center, the catch 30 may be turned so as to engage with the end of the lever and hold it in its downward position and thereby hold the pawl 19 disengaged from the ratchet.

The driving mechanism for connecting the axle 5 with the axle of the broom may be any well known form of connection. As shown in the drawings there is mounted on the axle 5 a beveled wheel 32 which engages with a gear 33 upon the counter shaft 34 journaled in bearings secured to the frame of the machine. Mounted on the counter shaft 34 is a sprocket wheel and mounted on the axle of the broom is a sprocket wheel. A sprocket chain 38 runs over the two sprockets so that when the axle 5 rotates, the broom 10 will also rotate.

What I claim is:

1. In a street sweeping machine, an axle on which two wheels are mounted, a rotary broom, two arms on which the axles of the broom are journaled intermediate their ends, said arms being pivoted at their forward ends to a fixed part of the frame of the machine, a tie-rod at the rear of the broom axle rigidly connected with one of said arms and pivotally connected at the other end with the other of said arms and intermediate mechanism between the wheels and the broom axle whereby the rotation of the wheels gives rotation to the broom.

2. In a street sweeping machine, an axle on which two wheels are mounted, a rotary broom, two arms on which the axles of the broom are journaled intermediate their ends, said arms being pivoted at their forward ends to a fixed part of the frame of the machine to permit lifting of the broom from the ground, a tie-rod rigidly connecting together said arms in front of the broom axle, a tie-rod at the rear of the broom axle rigidly connected with one of said arms and pivotally connected at the other end with the other of said arms and intermediate mechanism between the wheels and the broom axle whereby the rotation of the wheels gives rotation to the broom.

3. In a street sweeping machine, an axle on which two wheels are mounted, a rotary broom, two arms on which the axles of the broom are journaled intermediate their ends, said arms being pivoted at their forward ends to a fixed part of the frame of the machine to permit lifting of the broom from the ground, a tie-rod rigidly connecting together said arms in front of the broom axle, a tie-rod at the rear of the broom axle rigidly connected with one of said arms and pivotally connected at the other end with the other of said arms and another tie-rod at the rear of said broom axle rigidly connected at one end with one of said arms and pivotally connected at the other end with the frame and intermediate mechanism between the wheels and the broom axle whereby the rotation of the wheels gives rotation to the broom.

4. In a street sweeping machine, an axle on which two wheels are mounted, a rotary broom, two arms on which the axles of the broom are journaled intermediate their ends, said arms being pivoted at their forward ends to a fixed part of the frame of the machine, a tie-rod at the rear of the broom axle rigidly connected with one of said arms and pivotally connected at the other end with the other of said arms, and another tie-rod rigidly connected at one end with one of said arms and pivotally connected at the other end with a suitable support and intermediate mechanism between the wheels and the broom axle whereby the rotation of the wheels gives rotation to the broom.

In testimony whereof I affix my signature, in presence of two witnesses.

JOSIAH FOWLER.

Witnesses:
 WILLIAM A. COPELAND,
 ALICE H. MORRISON.